United States Patent
Weiss et al.

(10) Patent No.: US 10,474,400 B1
(45) Date of Patent: Nov. 12, 2019

(54) SYSTEMS AND METHODS FOR UPLOADING IMAGE FILES

(71) Applicant: WALGREEN CO., Deerfield, IL (US)

(72) Inventors: Benjamin Weiss, Chicago, IL (US); Abraham Jeyaraj, Chicago, IL (US)

(73) Assignee: WALGREEN CO., Deerfield, IL (US)

( * ) Notice: Subject to any disclaimer, the term of this patent is extended or adjusted under 35 U.S.C. 154(b) by 0 days.

(21) Appl. No.: 15/465,007

(22) Filed: Mar. 21, 2017

(51) Int. Cl.
  *G06F 3/12* (2006.01)
  *H04N 1/00* (2006.01)

(52) U.S. Cl.
  CPC .............. *G06F 3/122* (2013.01); *G06F 3/126* (2013.01); *G06F 3/1212* (2013.01); *G06F 3/1253* (2013.01); *G06F 3/1288* (2013.01); *G06F 3/1292* (2013.01); *H04N 1/00137* (2013.01); *H04N 1/00167* (2013.01); *H04N 1/00177* (2013.01); *H04N 1/00188* (2013.01)

(58) Field of Classification Search
  CPC ................................ G06F 3/1212; G06F 3/122
  See application file for complete search history.

(56) References Cited

U.S. PATENT DOCUMENTS

| | | | | |
|---|---|---|---|---|
| 6,734,994 | B2 * | 5/2004 | Omori | H04N 1/32064 358/1.13 |
| 8,060,826 | B2 * | 11/2011 | Park | H04N 1/00291 715/720 |
| 8,453,017 | B2 * | 5/2013 | Yamashirodani | G03G 15/5079 399/10 |
| 8,806,332 | B2 * | 8/2014 | Cok | G06T 11/60 715/243 |
| 2014/0063311 | A1 * | 3/2014 | McCauley | H04N 1/00137 348/333.01 |
| 2017/0214930 | A1 * | 7/2017 | Loughry | H04N 19/436 |

* cited by examiner

*Primary Examiner* — Ibrahim Siddo
(74) *Attorney, Agent, or Firm* — Marshall, Gerstein & Borun LLP; Randall G. Rueth

(57) ABSTRACT

Systems and methods for uploading image files to a print server are provided. Parallel processing techniques may be utilized to improve the upload speed. As one example, the systems and methods may resize image files having a resolution exceeding a maximum useful resolution prior to transmission. The maximum useful resolution is determined based on a printer resolution and a print size. As another example, the image files may be transmitted to the print server as a multithreaded stream of image files.

17 Claims, 6 Drawing Sheets

SYSTEMS AND METHODS FOR UPLOADING IMAGE FILES

FIELD OF THE DISCLOSURE

This disclosure relates generally to uploading image files to a server, in particular, to improving the speed at which the image files are uploaded to the server through parallel processing techniques.

BACKGROUND DESCRIPTION

As part of the development of mobile computing, individuals may now capture high quality digital photographs with their mobile phones and other personal electronic devices. However, many of these personal electronic devices often lack the ability to create a physical print of digital photographs. Thus, if the individual wants to create a physical print of the digital photograph, the individual typically transfers the digital photographs to a computing device that is capable of producing the physical print.

To this end, the amount of data required to transfer the digital photographs to the device capable of producing a physical print is generally increasing over time. Due to the increasing quality of mobile cameras, the size of the digital photograph files produced by personal electronic devices has also increased. For example, a 12 megapixel image captured by a mobile phone may have a file size over 3 megabytes (MB). Moreover, many individuals desire printing many photos at once (which may decrease shipping expenses to the individual). All in all, individuals are generally transferring more digital photographs having larger files sizes than previously.

Currently, however, this transfer process is time consuming and may use a significant portion of an individual's allotted bandwidth. Due to these frustrations, individuals tend to avoid frequently creating physical prints of digital photographs. Thus, there is a need to improve the digital photograph transfer process to improve the speed at which digital photographs are transferred to a remote server.

SUMMARY

In an embodiment, a method for uploading a plurality of image files is provided. The method may be performed by an application executing on an electronic device. The electronic device may include a plurality of processors, including a central processing unit (CPU) and a graphics processing unit (GPU), as well as a memory coupled to the plurality of processors. The method may include (1) causing the plurality of processors to present an image file selection interface in the application executing on the electronic device; (2) receiving, via the image file selection interface, a selection of image files, each image file having an image resolution; (3) the application causing the plurality of processors to identify a print size for each image file in the selection of image files; (4) the application causing the plurality of processors to retrieve a maximum resolution associated with a printer; (5) for each image file in the selection of image files, the application causing the plurality of processors to calculate a maximum useful resolution for the image file based on the maximum resolution of the printer and the print size for the image file; (6) the application causing the plurality of processors to determine a set of image files within the selection of image files, wherein for each image file in the set of image files, the image resolution is greater than the maximum useful resolution; (7) the application causing the GPU to resize image files from the set of image files in parallel, wherein the image files are resized from the respective image resolution to the respective maximum useful resolution; and (8) the application causing the one or more processors to transmit from the electronic device, over a communications network and to a print server, the selection of image files, the selection of image files including the resized image file for image files within the set of image files.

In another embodiment, an electronic device for uploading a plurality of image files may be provided. The electronic device may include (i) one or more transceivers; (ii) a plurality of processors; and (iii) one or more non-transitory memories coupled to the plurality of processors. The one or more non-transitory memories may include computer executable instructions stored therein. The instructions, when executed by the plurality of processors, cause the electronic device to (1) present an image file selection interface; (2) receiving, via the image file selection interface, a selection of image files, each image file having an image resolution; (3) identify a print size for each image file in the selection of image files; (4) retrieve a maximum resolution associated with a printer; (5) for each image file in the selection of image files, calculate a maximum useful resolution for the image file based on the maximum resolution of the printer and the print size for the image file; (6) determine a set of image files within the selection of image files, wherein for each image file in the set of image files, the image resolution is greater than the maximum useful resolution; (7) resize the image files within the set of image files from the respective image resolution to the respective maximum useful resolution; and (8) transmit, via the one or more transceivers, the selection of image files to a print server as a multithreaded stream of image files, the selection of image files including the resized image file for image files within the set of image files.

DETAILED DESCRIPTION

Figure 1:
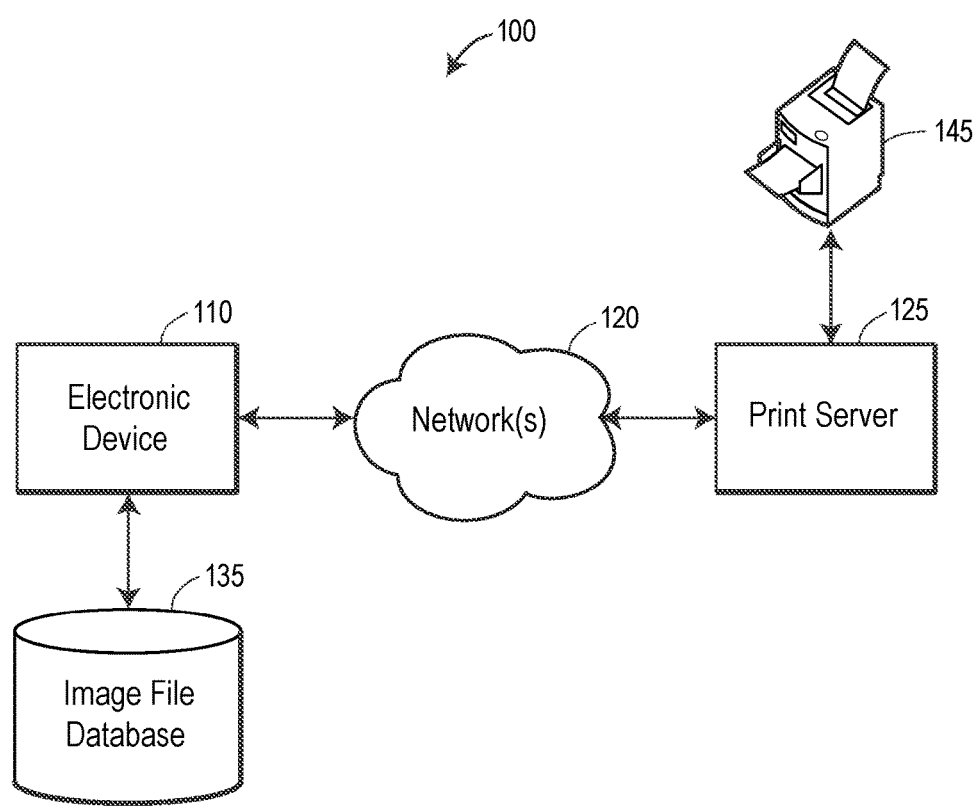
FIG. 1 illustrates an example environment for uploading image files to a print server.

The present embodiments may relate to, inter alia, receiving a selection of image files to uploaded to a print server, identifying a print size for the image file, retrieving a maximum resolution associated with a printer, resizing image files to a maximum useful resolution based on the printer resolution and the print size, transmitting the selection of image files to the print server, and/or parallel processing techniques that improve one or more of the aforementioned actions. For example, the present embodiments may further include resizing the image files using a graphics processing unit (GPU) instead of a central processing unit (CPU). As another example the present embodiments may include transmitting the image files to the print server as a multithreaded stream of image files.

In an aspect, users may interact with an application that facilities the techniques described herein. In some embodiments, the application may be executing on a mobile device (e.g., smart phone). In these embodiments the application may be distributed via an app store and/or a hosted download server. In other embodiments, the application may be provided via an internet browser executing on an electronic device, such as a personal computer or a mobile device. Regardless of how the application is provided, the application may present one or more user interfaces that enable the user to upload image files to a print server.

In an aspect, one such user interface may enable the user of the electronic device to select a plurality of image files to print via a printer interconnected to a print server. This user interface may provide access to any image file stored locally at the electronic device and/or at a third party server. When an image file is selected, the application may present another interface that enables the user to select a print size for the image file. While in some embodiments, the print size may be a traditional print size, such as 4×6, 5×7, or 11×14, in other embodiments the print size may be any print size supported by a printer interconnected to the print server. For example, a particular printer may support making prints having non-rectangular shapes or having particularly large dimensions.

It should be appreciated that an image file may contain more data than a printer is capable of representing in a physical print. For example, if a printer supports 300 dots per inch (DPI), a 4×6 print can only represent 2.16 million pixels (megapixels or MP). However, many cameras support image resolutions far in excess of 2.16 MP. Accordingly, any pixel in excess of the 2.16 MP supported by the printer provides information that is not useful to the printer. Thus, to reduce the amount data transmitted to the print server, the application may remove the non-useful data from the image file prior to transmission.

In an aspect, to remove this non-useful data, the application may resize a selected image file to the maximum useful resolution supported by the printer. As it is used herein, "resizing" generally refers to the act of reducing the resolution (i.e., the pixel-wise dimensions) of an image file to produce an image file having the maximum useful resolution supported by the printer. While the resizing operation involves complex averaging operations to produce the smaller image, the resultant image file preserves the quality of the originally captured image. Said another way, the pixel density of the resized image is about the same as the original image. Conversely, "compressing" an image file maintains the original image size, but discards some of the quality data therein. Thus, while both resizing and compressing reduces the file size of an image file, a compressed image file typically produces a lower quality print than a resized image file. In other words, by resizing an image file, the byte volume of the image file transmitted to the print server may be decreased without sacrificing image quality.

In embodiments in which many selected image files are to be resized prior to transmission, the application may take advantage of parallel processing techniques to optimize the speed at which the selected image files are resized. Due to their enhanced capabilities related to multithreaded processing, GPUs generally are capable of processing image files faster than CPUs. To this end, while a typical CPU may have 2, 4, or even 8 cores, a typical GPU has hundreds or even thousands of cores. This enables a GPU to divide simple, repetitive tasks, such as those involved in resizing an image file, across multiple cores simultaneously. Conversely, the serial nature of CPUs generally requires each task to complete prior to beginning the next. In our testing, for some sets of image files, resizing the set of image files using a GPU is nearly twenty time faster than resizing the set same set of image files using a CPU.

In another aspect, to improve the speed at which the selection of image files are transferred to the print server, the application may transmit the selection of image files as a multithreaded stream of image files. To this end, each thread within the stream of image files may be associated with uploading a respective image file from the selection of image files. Accordingly, the stream of image files may include multiple image files being concurrently transferred to the print server. Moreover, if an error occurs in the transmission of a single image file, the other threads are not impacted. Thus, an error occurring in the transmission of a single image file may not delay or otherwise hinder the transmission of the remaining image files.

System Overview

FIG. 1 illustrates an example environment 100 associated with uploading image files. to a print server. Although FIG. 1 depicts certain entities, components, and devices, it should be appreciated that additional or alternate entities and components are envisioned.

As illustrated in FIG. 1, the environment 100 may include an electronic device 110. The electronic device 110 may be any electronic device, such as a smart phone, a desktop computer, a laptop, a tablet, a phablet, a smart watch, smart glasses, wearable electronics, pager, personal digital assistant, a home assistant and/or digital concierge device, and/or any other electronic device, including computing devices configured for wireless radio frequency (RF) communication. In some embodiments, the electronic device 110 may further include a camera or other image file creation capabilities. The electronic device 110 may store one or more image files in a memory therein. For example, the electronic device 110 may include a database of image files 135 within the memory. Although FIG. 1 depicts the image file database 135 as coupled to the electronic device 110, it is envisioned that the image database 135 may be maintained in the "cloud" such that any element of the environment 100 capable of communicating over the network 120 may directly interact with the photograph database 135. In some embodiments, the photograph database 135 may be additionally or alternatively stored at a print server 125 and/or another third party server (such as one associated with DropBox, Amazon, Google Drive, iCloud, etc.).

In an aspect, the electronic device 110 may include one or more processors. To this end, the electronic device 110 may include both a CPU and a GPU. In some embodiments, the CPU and/or the GPU includes a plurality of cores capable of executing instructions in parallel to one another. As described elsewhere herein, the CPU may be optimized to serially execute instructions, whereas the GPU may be optimized for greater efficiency when executing instructions in parallel.

In an embodiment, the electronic device 110 may store machine-readable code representative of an image file printing application stored in a memory therein. As part of the process to print the one or more image files stored in the image file database 135, the user may launch and/or execute the image file printing application. In response, the electronic device 110 may display one or more interfaces that may direct the user through the process of uploading image files and/or printing image files. In some embodiments, the electronic device 110 may include a browser application that enables the user to navigate to a website to perform the functionality associated with the image file printing application. Accordingly, description herein of the functionality of an application, refers also to providing similar functionality via a web site, and vice versa.

According to aspects, the application may enable the user of the electronic device 110 to manually select one or more image files for printing. To this end, the application may cause a list of one or more image files stored at the image file database 135 on a display of the electronic device 110. According to aspects, the application may enable the user to indicate one or more settings for each image file. For example, one setting may be an indication of a particular printer to use when printing the image file. As another example, one setting may be a print size of the printed image file.

According to present embodiments, the electronic device 110 communicate with the print server 125 via a network 120. The network 120 may facilitate any type of data communication via any standard or technology (e.g., GSM, CDMA, TDMA, WCDMA, LTE, EDGE, OFDM, GPRS, EV-DO, UWB, IEEE 802 including Ethernet, WiMAX, WiFi, Bluetooth, and others). In some embodiments, the electronic device 110 may transmit the image files and any corresponding settings to the print server for printing and/or storage.

Figure 2:
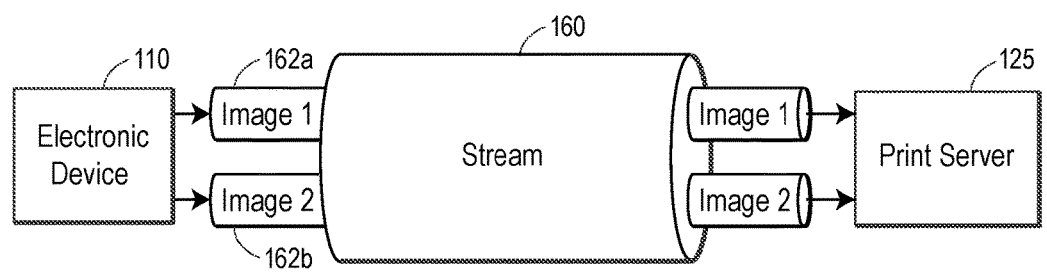
FIG. 2 illustrates an example multithreaded stream of data, such as one that is communicated over the network of FIG. 1.

In some embodiments, the application may be configured to cause the electronic device 110 to transmit the image files as a multithreaded stream of image files. With simultaneous reference to FIG. 2, illustrated is an example multithreaded stream of image files 160. As illustrated, the stream 160 may comprise several threads associated with the transfer of an image file. Although FIG. 2 only illustrates two threads 162*a* and 162*b* within the stream 160, it is envisioned that any number of threads may be utilized. Each thread may be separate connection between the electronic device 110 and the print server 125. Accordingly, each thread may be associated with a distinct session ID and operate independently of one another. Thus, if one thread experiences an error uploading a particular image file, the upload of other image files within other threads is not impacted. This is unlike the conventional, single-threaded approach where a connection error may interrupt the upload process for all remaining image files. To this end, the application may cause the electronic device 110 to tear down the thread experiencing the error and establish a new thread to upload the impacted image file independently of any other thread.

Further, the use of multiple threads provides other advantages to the traditional, single-threaded approach. As one example, the network 120 may be configured to only allocate a fixed amount resources to each connection. Because each thread is a distinct connection between the electronic device 110 and the print server 125, the network 120 may actually allocate more resources to the stream 160 than a single-threaded connection. Of course, the network 120 has a finite amount of resources. Thus, after a certain number of threads, the gains in increased resource allocation are offset by network congestion caused by transmitting additional data simultaneously. Accordingly, in some embodiments, prior to transmitting the image files to the print server 125, the application may cause the electronic device 110 to establish one or more test connections to the print server 125 to determine an optimal number of threads to include within the stream 160.

In one aspect, when the application successfully causes the electronic device 110 to upload an image file to the print server, the application may analyze one or more characteristics of the transfer to determine whether a subsequent image file should be transmitted via the current thread, or whether the current thread should be torn down and a new thread should be established. To this end, if the upload of the image file is associated with inferior transmission characteristics than other concurrent threads (e.g., lower transfer rate, higher packet loss, longer round trip delays, etc.), the application may determine that a subsequent image file can be uploaded to the print server 125 faster by establishing a new thread. Conversely, if the transmission characteristics are within a threshold performance relative to the other concurrent threads, the application may determine that a subsequent image file should be uploaded to the print server 125 via the current thread.

In another aspect, the application may be configured to utilize parallel processing techniques to transmit the threads within the stream 160. In one embodiment, the application may utilize the CPU of the electronic device 110 to transmit the image file within the thread 162*a* to the print server 125 and the GPU of the electronic device 110 to transmit the image file within the thread 162*b* to the print server 125. Additionally or alternatively, the application may utilize a first core of the GPU of the electronic device 110 to transmit the image file within the thread 162*a* to the print server 125 and a second core of the GPU of the electronic device 110 to transmit the image file within the thread 162*b* to the print server 125.

Returning to FIG. 1, as shown in the environment 100, the print server 125 may be communicatively connected with a printer 145. The printer 145 may be any printer that is capable of generating a physical print of an image based upon received image files. According to aspects, the printer 145 may be associated with a maximum resolution and/or a list of supported print sizes. Although FIG. 1 only depicts the printer 145, it should be appreciated that the print server 125 may be interconnected to any number of printers having respective maximum resolutions and lists of supported print sizes. After the print server 125 receives the image files transmitted from the electronic device 110, the print server 125 may then route the image files to the printer 145 to generate a physical print for the image files.

Image File Upload

Figure 3:
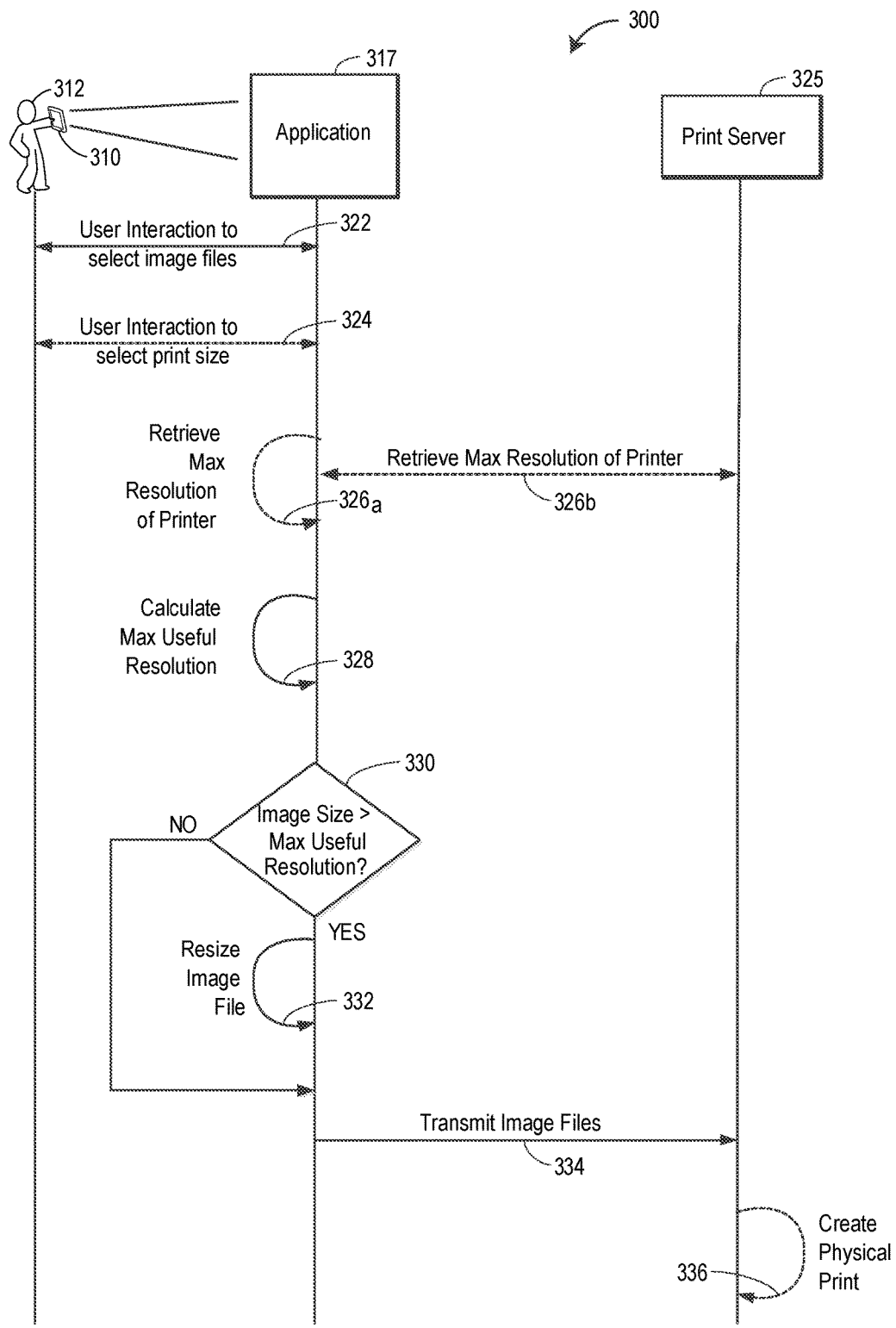
FIG. 3 illustrates an example signal diagram for uploading image files to a print server.

Referring to FIG. 3, illustrated is a signal diagram 300 associated with uploading image files to a print server. In particular, FIG. 3 includes a print server 325 (such as the print server 125 as described with respect to FIG. 1), an application 317, and a user 312 associated with an electronic device 310 (such as the electronic device 110 as described with respect to FIG. 1). It should be appreciated that the electronic device 310 may comprise any type of electronic device. Although only the electronic device 310 is depicted in FIG. 3, it should be appreciated that the print server 325 may communicate with a plurality of electronic devices uploading respective pluralities of image files.

The signal diagram 300 may begin when the application 317 executing on the electronic device 310 presents an image file selection interface on the electronic device 310. The user 312 may then interact (322) with the application 317 to select one or more image files. In one aspect, each of the image files is associated with an image resolution. The application 317 may be configured to access a plurality of image files stored at the electronic device 310 and/or at a third party server. If the user 312 selects an image file stored at a third party server, the application 317 may generate a local copy of the image file.

Figures 4A, 4B, 4C:
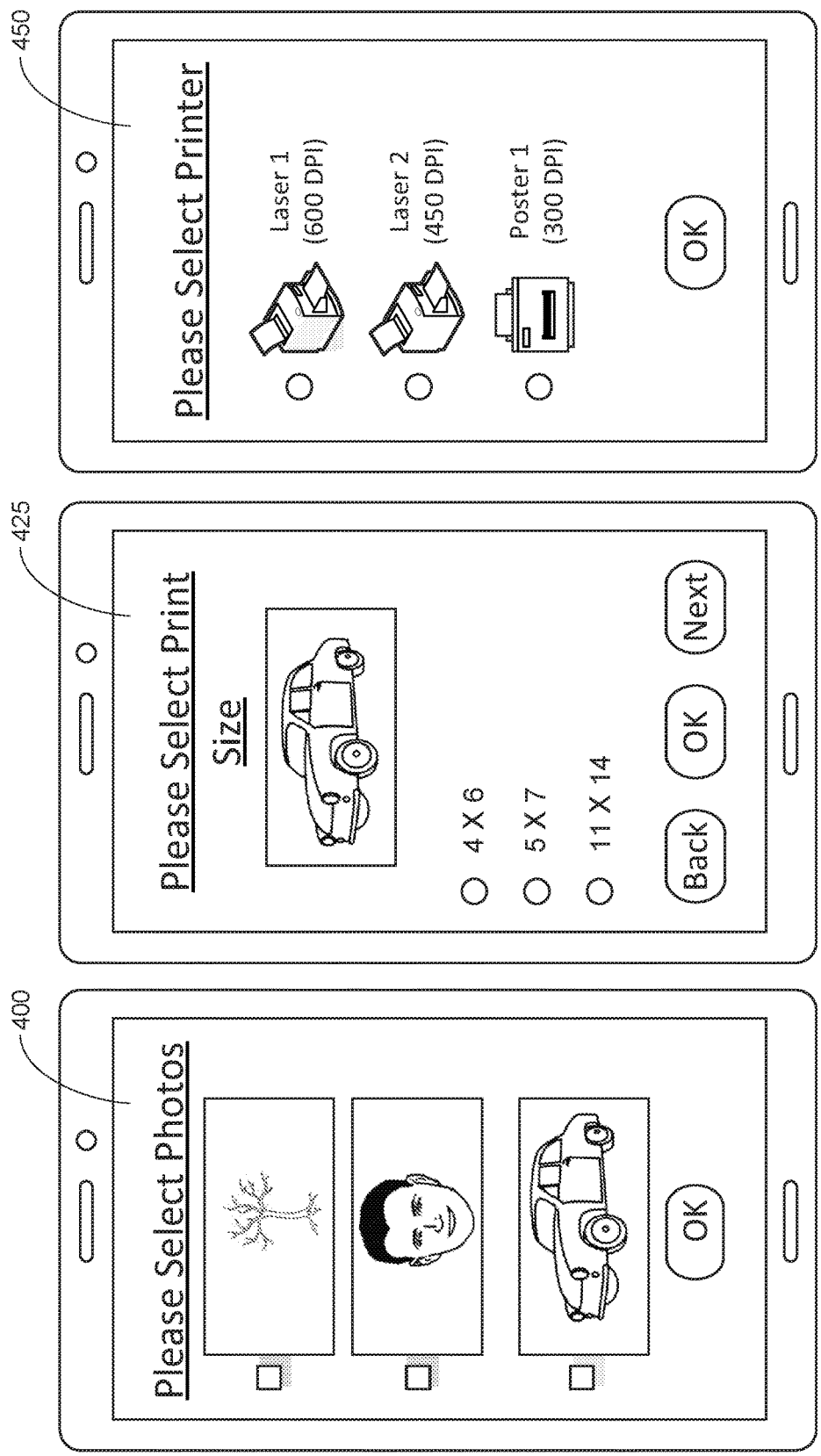
FIG. 4A illustrates an example interface for selecting image files to print via a user interface of the electronic device of FIG. 1.
FIG. 4B illustrates an example interface for selecting a print size via a user interface of the electronic device of FIG. 1.
FIG. 4C illustrates an example interface for a printer via a user interface of the electronic device of FIG. 1.

With concurrent reference to FIG. 4A, depicted is an example image file selection interface 400. The image file selection interface 400 may include a plurality of thumbnails corresponding to the plurality of image files. The image file selection interface 400 may further include an interface element corresponding to each thumbnail (such as a checkbox, radio button, or the thumbnail itself) that, when selected by the user 312, indicates that the user 312 wants to print the corresponding image file. Although FIG. 4A only depicts three image files, it should be appreciated that the image file selection interface 400 may be scrollable and/or otherwise navigable to permit the selection of any number of image files. When the user 312 finishes selecting image files to print, the user 312 may interact with the image file selection interface 400 (such as by pressing the depicted OK button) to indicate that the selection process is complete. Of course, the image file selection interface 400 may include additional or alternative known user interface techniques to receive the selection of image files from the user 312.

In response to the user 312 indicating that the user 312 has completed the image file selection process, the application 317 may present a print size selection interface that enables the user 312 to select (324) a print size for the selected image files. In some embodiments, the print size selection interface may enable the user 312 to select a print size for all of the selected image files at once. Additionally or alternatively, the print size selection interface may enable the user 312 to individually set the print size for one or more image files of the selected image files.

With concurrent reference to FIG. 4B, depicted is an example print size selection interface 425 that enables the user 312 to select the print size for an image file. As depicted, the print size selection interface 425 may include a thumbnail for the image file that has been selected. Additionally, the print size selection interface 425 may include a list of available print sizes. Although FIG. 4B only depicts common print sizes such as 4×6, 5×7, or 11×14, it should be appreciated any print size supported by a printer may be included in the list of available print sizes. The print size selection interface 425 may further include an interface element corresponding to each listed print size (such as a checkbox, radio button, or the text itself) that, when selected by the user 312, indicates the size utilized to print the selected image file. In embodiments that enable the user 312 to set the print size for each image file individually, the print size selection interface 425 may include elements (such as a next or back button) that enable the user to cycle between the selected image files. When the user 312 finishes selecting the print size for the selected image files, the user 312 may interact with the print size selection interface 425 (such as by pressing the depicted OK button) to indicate that the print size selection process is complete. Of course, the image file selection interface 425 may include additional or alternative known user interface techniques to receive the selection of print sizes.

In some embodiments, the application 317 may enable the user 312 to select a particular printer to print the selected image files. In these embodiments, the application 317 may present a printer selection interface that lists one or more printers interconnected to the print server 325. In one aspect, each listed printer may correspond to a particular location, such as a retail store at which the user 312 may pick up the printed image files and/or a commercial processing location that mails the physical prints to the user 312. In another aspect, each listed printer may correspond to a list of supported print sizes. In yet another aspect, each listed printed may correspond to a maximum resolution at which the printer is capable of printing. In an embodiment, the application 317 may store a default printer or a last used printer that is utilized if the user 312 does not select a printer.

With concurrent reference to FIG. 4C, depicted is an example printer selection interface 450. The printer selection interface 400 may include a list of printers interconnected to the print server 325. In one embodiment, the prior to presenting the list of printers, the application 317 retrieves the list of printers and/or updates to the list of printers from the print server 325. The printer selection interface 450 may further include an interface element corresponding to each listed printer (such as a checkbox, radio button, or the name of the printer itself) that, when selected by the user 312, indicates that the user 312 wants to print image files using the selected printer. Although FIG. 4C only depicts three printers, it should be appreciated that the printer selection interface 450 may include any number of printers. When the user 312 finishes selecting a printer, the user 312 may interact with printer selection interface 450 (such as by pressing the depicted OK button). Of course, the printer selection interface 450 may include additional or alternative known user interface techniques to receive the selection of a printer.

In some embodiments, the selection of the printer may impact what print sizes are presented by the print size selection interface 425. To this end, the print size selection interface 425 may not list any print sizes not supported by the selected printer. Similarly, the selection of a print size may impact what printers are presented by the printer selection interface 450 such that printer selection interface 450 does not list any printers that do not support the selected print size.

After the user 312 has selected a printer, the application 317 may retrieve (326) a maximum resolution for the printer. In some embodiments, the application 317 may cache or otherwise locally store the maximum resolution of the printer. In these embodiments, the application 317 may retrieve (326a) the locally stored maximum resolution of the printer. In other embodiments, the application 317 retrieves (326b) the maximum resolution for the printer by polling the print server 325.

According to aspects, after the application 317 determines both the print size(s) for the selected image files and the maximum resolution for the printer, the application calculates (328) a maximum useful resolution. The maximum useful resolution is an indication of the maximum number of pixels that the selected printer is capable of depicting in a physical print. To this end, the maximum useful resolution may be calculated by the following equation:

$$\text{Maximum Useful Resolution} = (\text{Print Size Area}) * (\text{Maximum Printer Resolution})^2 \qquad \text{EQUATION 1:}$$

For each selected image file, the application 317 may compare (decision 330) the image resolution to the maximum useful resolution. If the image resolution is less than the maximum useful resolution (the "NO" fork), the application 317 may queue the image file for transmission without additional processing. On the other hand, if the image resolution exceeds the maximum useful resolution (the "YES" fork), the application 317 may queue the image file for resizing.

In an aspect, the application 317 may then resize (332) the set of image files in the resizing queue. As described elsewhere herein, resizing reduces the image resolution of the image file to the maximum useful resolution without impacting the image quality. In some embodiments, the application 317 utilizes a GPU of the electronic device 310 to perform the resize operation on the image files. In an aspect, the GPU of the electronic device 310 resizes multiple image files simultaneously by performing the resizing operations by utilizing multiple cores simultaneously. The application 317 may then store the resized image files in temporary storage such that the electronic device 310 and/or the third party server still maintains the original image file. The application 317 may then add the resized image files to the transmission queue along with the image files that did not need resizing.

The application 317 may then transmit (334) the image files in the transmission queue to the print server 325. In some embodiments, the application 317 transmits the image files to the print server 325 as a multithreaded stream of image files, as described elsewhere herein. To further improve the upload speed, in scenarios where the selection of image files included both image files exceeding the maximum useful resolution and image files within the maximum useful resolution, the application 317 may cause the electronic device 310 to begin transmitting the image files within the maximum useful resolution while the application 317 is still resizing the image files exceeding the maximum useful resolution. Upon receiving the transmitted image files, the print server 325 may route the image files to the selected printer to create (336) a physical print of the image files. The signal diagram 300 may include additional, fewer, or alternate actions, including those discussed elsewhere herein. For example, various actions may be performed in an order other that what is depicted by the signal diagram 300.

Example Method

Figure 5:
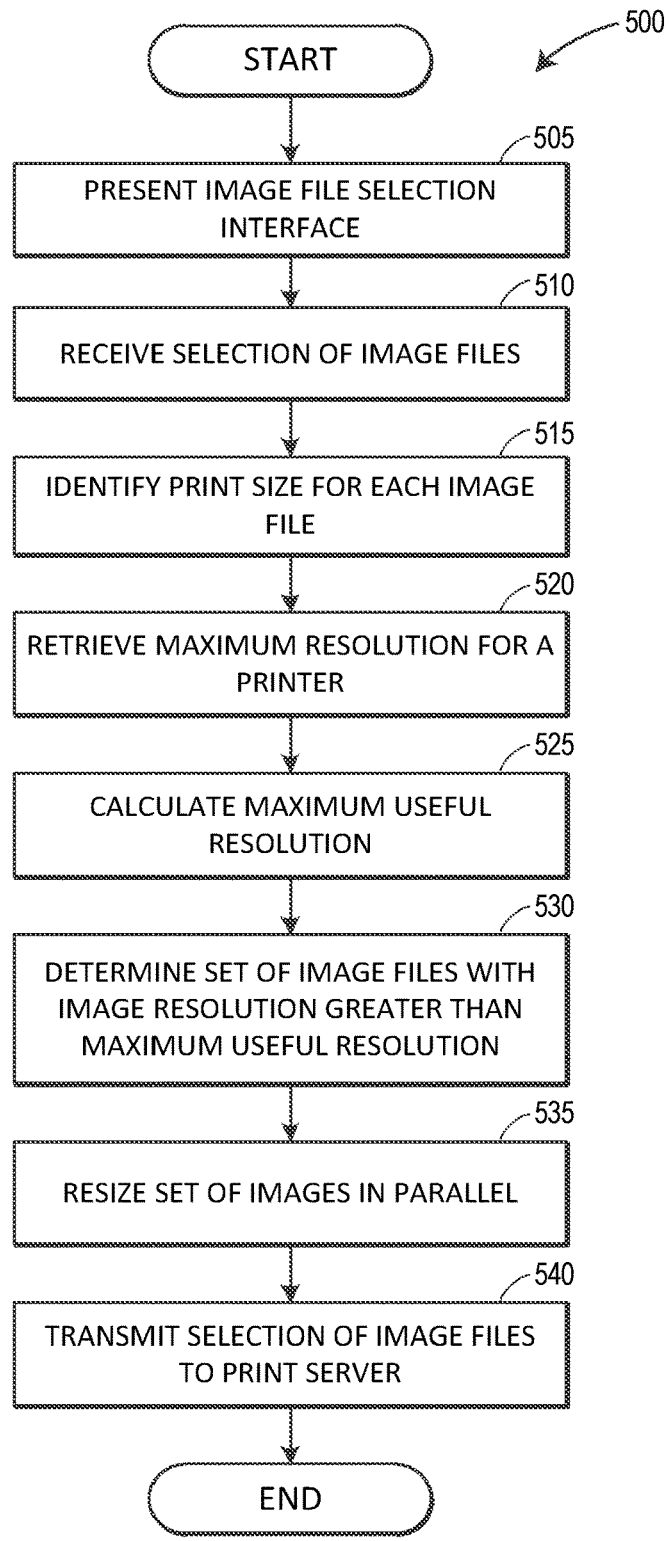
FIG. 5 is a flow diagram of an example method for uploading image files to a print server.

Referring to FIG. 5, illustrated is a block diagram of an example method 500 for uploading a selection of image files to a print server. The method 500 may be facilitated by an application executing on an electronic device (such as the electronic device 310 as described with respect to FIG. 1) communicatively coupled to the printer server (such as the print server 125 as described with respect to FIG. 1). The electronic device may include a plurality of processors, wherein the plurality of processors includes a central processing unit (CPU) and a graphics processing unit (GPU). Further, the electronic device may include an application executing thereon to facilitate the performance of the method 500.

The method 500 may begin when the application causes electronic device to present an image file selection interface in the application executing on the electronic device (Block 505). In one embodiment, the image file selection interface is the image file selection interface 400 described with respect to FIG. 4A.

At block 510, the application may receive, via the image file selection interface, a selection of image files to print. Each of the image files may be associated with an image resolution for the image represented by the image file.

At block 515, the application may cause the electronic device to identify a print size for each image file in the selection of image files. To identify the print size, the application may cause the electronic device to present a print size selection interface in the application executing on the electronic device. In one embodiment, the image file selection interface may be the print size selection interface 425 described with respect to FIG. 4B. In an aspect, the print size selection interface may indicated one or more print sizes supported by one or more printers interconnected with the print server. The application may identify the print size by receiving, via the print size selection interface, a selection of a print size for an image file in the selection of image files. Additionally or alternatively, the application may associate an image file in the selection of image files with a default print size or a previously used print size.

At block 520, the application may retrieve a maximum resolution associated with a printer. To retrieve the maximum resolution, the application may cause the electronic device to present a printer selection interface in the application executing on the electronic device. In one embodiment, the printer selection interface may be the printer selection interface 450 described with respect to FIG. 4C. In an aspect, the printer selection interface may indicate one or more printers interconnected with the print server. The printer selection interface may indicate a maximum resolution for each of the one or more printers. In an embodiment, the application may receive, via the printer selection interface, a selection of the printer from the one or more printers.

At block 525, for each image file in the selection of image files, the application may calculate a maximum useful resolution for the image file based on the maximum resolution of the printer and the print size for the image file. At block 530, the application may determine a set of image files within the selection of image files. The set of image files may include image files within the selection of image files that have an image resolution greater than the maximum useful resolution.

At block 535, the application may cause the electronic device to resize the image files in the set of image files from the respective image resolution to the respective maximum useful resolution. In an embodiment, the application may utilize the GPU of the electronic device to resize the image files in the set of image files in parallel.

At block 540, the application cause the electronic device to transmit, over a communications network, the selection of image files to a print server. The selection of image files may include the resized image file for image files within the set of image files. Transmitting the selection of image files may cause the printer to create a physical print of the selection of image files. In an embodiment, the application may transmit the selection of image files as a multithreaded stream of image files over the communications network. The multithreaded stream of image files may include a first image file of the selection of image files being transmitted via a first thread, and a second image file of the selection of image files being transmitted via a second thread. In one embodiment, a first processor of the plurality of processors may transmit image files in the first thread to the print server, while a second processor of the plurality of processors transmits image files in the second thread to the print server. Additionally or alternatively, a first core of a particular processor of the plurality of processors may transmit image files in the first thread to the print server, while a second core of the particular processor of the plurality of processors transmits image files in the second thread to the print server.

In some scenarios, responsive to the first image file of the selection of image files being successfully transmitted to the print server, that application may transmit a third image file of the selection of image files via the first thread. In other scenarios, responsive to the first image file of the selection of image files being successfully transmitted to the print server, the application may transmit the third image file of the selection of image files via a third thread. Similarly, responsive to the first image file of the selection of image files not being successfully transmitted to the print server, that application may transmit the first image file of the selection of image files via the third thread. The signal diagram 300 may include additional, fewer, or alternate actions, including those discussed elsewhere herein.

Hardware Description

Figure 6:
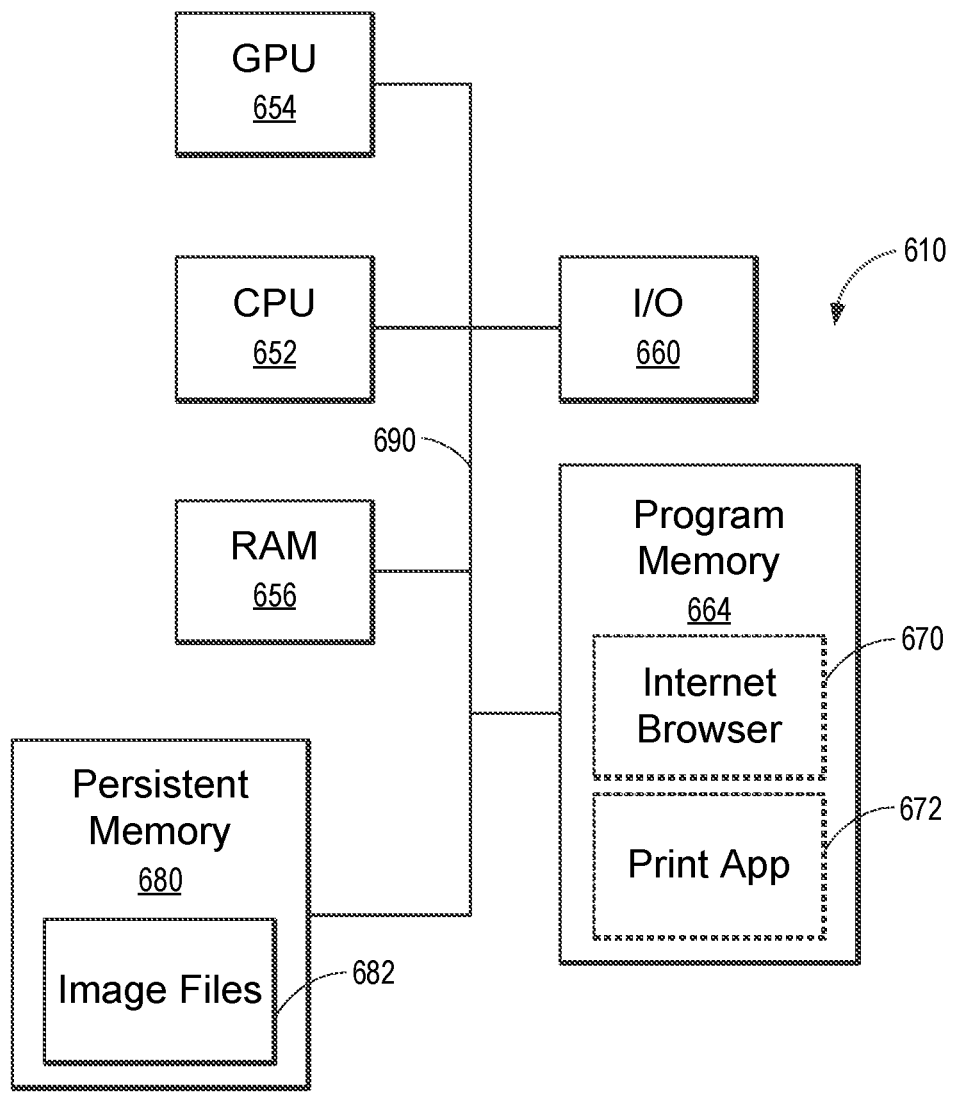
FIG. 6 illustrates an example electronic device in which the electronic device of FIG. 1 is implemented, according to an embodiment.

FIG. 6 illustrates a diagram for an example electronic device 610 (such as the electronic device 110 as described with respect to FIG. 1) in which the functionalities as discussed herein may be implemented. The electronic device 610 includes one or more processors, such as the depicted as a CPU 652 and a GPU 654. Each of the CPU 652 and the GPU 654 may have multiple cores. During operation, the CPU 652 and/or the GPU 654 executes instructions stored in a program memory module 664 coupled to the CPU 652 and the GPU 654 via a system bus 690. In some implementations, the program memory module 664 is implemented in a random access memory (RAM) module 656, a persistent memory module 680, or both. The program memory module 664 may also store computer-readable instructions that regulate the operation of the electronic device 610. One set of instructions may be an internet browser 670 that contains instructions to facilitate interactions with a webpage-hosted printing application. Another set of instructions may be a dedicated printing application 672 stored at the electronic device 610. It should be appreciated that the program memory module 664 may store other sets of instructions, for example, an operating system that enables the user to execute other programs on the electronic device 610.

In addition to programs, the RAM module 656 and the persistent memory module 680 may store data in a volatile or non-volatile mode, respectively. The RAM module 656 and the persistent memory module 680 further include one or more forms of fixed and/or removable memory, such as read-only memory (ROM), electronic programmable read-only memory (EPROM), RAM, erasable electronic programmable read-only memory (EEPROM), and/or other hard drives, flash memory, MicroSD cards, and others. For example, image files 682 (which may be similar to the image file database 135 as described with respect to FIG. 1) may be stored as data structures in the persistent memory module 680.

The electronic device 610 may further include an I/O module 660. The I/O module 660 may include components that enable the electronic device 610 to send and receive data over a wireless or wired network (such as the network 120 described with respect to FIG. 1). The components may include one or more transceivers (e.g., WWAN, WLAN, WPAN, EVDO, CDMA, GSM and/or LTE transceivers) functioning in accordance with IEEE standards, 3GPP standards, or other standards. In addition to the transceivers, the I/O module 660 may include display screens, keys, mice, buttons, touch sensitive input panels, external ports or other components that enable someone to interact with the electronic device 610, such as to interact with an interface presented by an application.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Throughout this specification various user interfaces have been described. Although the figures and the corresponding description may describe the user interfaces as a graphical user interface presented on a display of an electronic device, other types of user interfaces are envisioned. For instance, many electronic devices include a concierge application (such as Apple Siri, Google Now, Microsoft Cortana, Amazon Echo, etc.) that facilitates a feature-rich voice-based user interface. These voice-based user interfaces are capable of performing many functions of graphical user interfaces. Accordingly, any reference to a feature of a graphical user interface envisions an equivalent feature of a voice-based user interface.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Although the above text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

What is claimed:

1. A method for uploading a plurality of image files via an application executing on an electronic device, wherein the electronic device includes a plurality of processors including a central processing unit (CPU) and a graphics processing unit (GPU), and a memory coupled to the plurality of processors, the method comprising:
    causing the plurality of processors to present an image file selection interface in the application executing on the electronic device;
    receiving, via the image file selection interface, a selection of image files, each image file having an image resolution;
    the application causing the plurality of processors to identify a print size for each image file in the selection of image files;
    the application causing the plurality of processors to retrieve a maximum resolution associated with a printer;
    for each image file in the selection of image files, the application causing the plurality of processors to calculate a maximum useful resolution for the image file based on the maximum resolution of the printer and the print size for the image file;
    the application causing the plurality of processors to determine a set of image files within the selection of image files, wherein for each image file in the set of image files, the image resolution is greater than the maximum useful resolution;
    the application causing the GPU to resize image files from the set of image files in parallel, wherein the image files are resized from the respective image resolution to the respective maximum useful resolution; and
    the application causing the one or more processors to transmit from the electronic device, over a communications network and to a print server, the selection of image files as a multithreaded stream of image files, wherein (i) a first image file of the selection of image files is transmitted via a first thread (ii) a second image file of the selection of image files is transmitted via a second thread, and (iii) the selection of image files includes the resized image file for image files within the set of image files.

2. The method of claim 1, wherein the transmission of the selection of image files causes the printer to create a physical print of the selection of image files.

3. The method of claim 1, further comprising:
    responsive to the first image file of the selection of image files being successfully transmitted to the print server, transmitting a third image file of the selection of image files via the first thread.

4. The method of claim 1, further comprising:
    responsive to the first image file of the selection of image files being successfully transmitted to the print server, transmitting a third image file of the selection of image files via a third thread.

5. The method of claim 1, further comprising:
responsive to the first image file of the selection of image files not being successfully transmitted to the print server, transmitting the first image file of the selection of image files via a third thread.

6. The method of claim 1, wherein:
a first processor of the plurality of processors transmits image files in the first thread to the print server, and
a second processor of the plurality of processors transmits image files in the second thread to the print server.

7. The method of claim 1, wherein:
a first core of a particular processor of the plurality of processors transmits image files in the first thread to the print server, and
a second core of the particular processor of the plurality of processors transmits image files in the second thread to the print server.

8. The method of claim 1, wherein causing the plurality of processors to retrieve a maximum resolution associated with a printer comprises:
causing the plurality of processors to present a printer selection interface in the application executing on the electronic device, the printer selection interface indicating one or more printers interconnected with the print server; and
receiving, via the printer selection interface, a selection of the printer from the one or more printers.

9. The method of claim 8, wherein printer selection interface indicates a maximum resolution for each of the one or more printers.

10. The method of claim 1, wherein causing the plurality of processors to identify a print size for each image file in the selection of image files comprises:
causing the plurality of processors to present a print size selection interface in the application executing on the electronic device, the print size selection interface indicating one or more print sizes supported by one or more printers interconnected with the print server; and
receiving, via the print size selection interface, a selection of a print size for an image file in the selection of image files.

11. The method of claim 1, wherein causing the plurality of processors to identify a print size for each image file in the selection of image files comprises:
causing the plurality of processors to associate an image file in the selection of image files with a default print size.

12. An electronic device for uploading a plurality of image files, the electronic device comprising:
one or more transceivers;
a plurality of processors; and
one or more non-transitory memories coupled to the plurality of processors,
wherein the one or more non-transitory memories include computer executable instructions stored therein that, when executed by the plurality of processors, cause the electronic device to:
present an image file selection interface;
receiving, via the image file selection interface, a selection of image files, each image file having an image resolution;
identify a print size for each image file in the selection of image files;
retrieve a maximum resolution associated with a printer;
for each image file in the selection of image files, calculate a maximum useful resolution for the image file based on the maximum resolution of the printer and the print size for the image file;
determine a set of image files within the selection of image files, wherein for each image file in the set of image files, the image resolution is greater than the maximum useful resolution;
resize the image files within the set of image files from the respective image resolution to the respective maximum useful resolution; and
transmit to a print server, via the one or more transceivers, a multithreaded stream of image files from the selection of image files, wherein (i) a first image file of the selection of image files is transmitted via a first thread (ii) a second image file of the selection of image files is transmitted via a second thread, and (iii) the selection of image files includes the resized image file for image files within the set of image files.

13. The electronic device of claim 12, wherein the plurality of processors include:
a central processing unit (CPU) and a graphics processing unit (GPU).

14. The electronic device of claim 13, wherein to resize the set of image file, the instructions, when executed by the plurality of processors, cause the electronic device to:
resize a first image file and a second image file of the set of image files in parallel using the GPU.

15. The electronic device of claim 14, wherein:
a first core of the GPU resizes the first image file, and
a second core of the GPU resized the second image file.

16. The electronic device of claim 12, wherein:
a first processor of the plurality of processors transmits image files in the first thread to the print server, and
a second processor of the plurality of processors transmits image files in the second thread to the print server.

17. The electronic device of claim 12, wherein:
a first core of a particular processor of the plurality of processors transmits image files in the first thread to the print server, and
a second core of the particular processor of the plurality of processors transmits image files in the second thread to the print server.

* * * * *